United States Patent [19]
Khullar et al.

[11] Patent Number: 6,009,319
[45] Date of Patent: *Dec. 28, 1999

[54] METHOD AND APPARATUS FOR REDUCING POWER CONSUMPTION IN A MOBILE RADIO COMMUNICATION DEVICE

[75] Inventors: Anders Khullar, Bjärred; Björn Olof Peter Ekelund, Arlöv, both of Sweden

[73] Assignee: Telefonaktiebolaget LM Ericsson, Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,202

[22] Filed: Sep. 6, 1996

[51] Int. Cl.$^6$ ........................................... H04B 1/16
[52] U.S. Cl. ........................... 455/343; 455/574; 370/311
[58] Field of Search .................... 455/38.3, 572, 455/578, 575, 343; 340/825.44; 330/311

[56] References Cited

U.S. PATENT DOCUMENTS

| | | | |
|---|---|---|---|
| 4,264,967 | 4/1981 | Fujita et al. | 368/156 |
| 4,456,386 | 6/1984 | Dellea | 368/201 |
| 5,058,203 | 10/1991 | Inagami | 455/343 |
| 5,142,699 | 8/1992 | Sato et al. | 455/343 |
| 5,280,650 | 1/1994 | Sbt | 455/343 |
| 5,283,568 | 2/1994 | Asai et al. | 455/380 |
| 5,416,808 | 5/1995 | Witsaman et al. | 375/350 |
| 5,428,820 | 6/1995 | Okada et al. | 455/343 |
| 5,448,755 | 9/1995 | Tanaka | 455/38.3 |

FOREIGN PATENT DOCUMENTS

2545623  11/1984  France.

*Primary Examiner*—Edward F. Urban
*Attorney, Agent, or Firm*—Burns, Doane, Swecker & Mathis, L.L.P.

[57] ABSTRACT

Methods and systems for generating timing signals in remote units which can be used in a radiocommunication system are described. A high accuracy clock can be used to provide a timing reference signal for a processor in the remote unit during times when highly accurate timing signals are required. During periods of low activity, the high accuracy clock can be turned off and a low accuracy clock can be used to generate the reference timing signals for the processor. Periodically, the accuracy of the low accuracy clock can be checked by determining a number of low accuracy clock pulses which are generated between system timing signals created based upon the high accuracy clock pulses. In this way, when the low accuracy clock is relied upon to create the system tuning signals, the accuracy is sufficient to enable the processor to recognize when it is time to again power up the high accuracy clock. Moreover, checking the accuracy of the low accuracy clock enables the processor to provide error compensation signals to a real time clock function which relies upon the low accuracy clock pulses for determining a current time.

19 Claims, 5 Drawing Sheets

METHOD AND APPARATUS FOR REDUCING POWER CONSUMPTION IN A MOBILE RADIO COMMUNICATION DEVICE

BACKGROUND

Applicants' invention relates generally to radiocommunication systems and more particularly to timing signal generation in remote units used in radiocommunication systems.

The growth of commercial radiocommunications and, in particular, the explosive growth of cellular radiotelephone systems have compelled system designers to search for ways to increase system capacity without reducing communication quality beyond consumer tolerance thresholds. One way to increase capacity is to use digital communication and multiple access techniques such as TDMA, in which several users are assigned respective time slots on a single radio carrier frequency.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

It can be seen that TDMA cellular systems operate in a buffer-and-burst, or discontinuous-transmission, mode: each mobile station transmits (and receives) only during its assigned time slots. At full rate, for example, an actively connected mobile station might transmit during slot 1, receive during slot 2, be idle during slot 3, transmit during slot 4, receive during slot 5, and be idle during slot 6, and then repeat the cycle during succeeding TDMA frames. Therefore, the mobile station, which may be battery-powered, can be switched off, or sleep, to save power during the time slots when it is neither transmitting nor receiving.

In addition to voice or traffic channels, cellular radiocommunication systems also provide paging/access channels (also known as control channels) for carrying call-setup messages between base stations and mobile stations. In some systems, idle mobile stations are assigned to predetermined paging slots. After being switched on, an idle mobile station needs to regularly monitor only its assigned paging time slots. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MN) of the called mobile station. The base stations will transmit a paging message intended for the mobile subscriber during the time slot assigned to the subscriber's equipment for pages. Each idle mobile station receiving a paging message in its assigned paging time slot compares the received MIN with its own stored MIN. The mobile station with the matching stored MIN transmits a page response over the particular control channel to the base station, which forwards the page response to the MSC. Thus, the idle mobile station can sleep during time slots other than its assigned paging time slot in order to conserve battery power.

Figure 1:
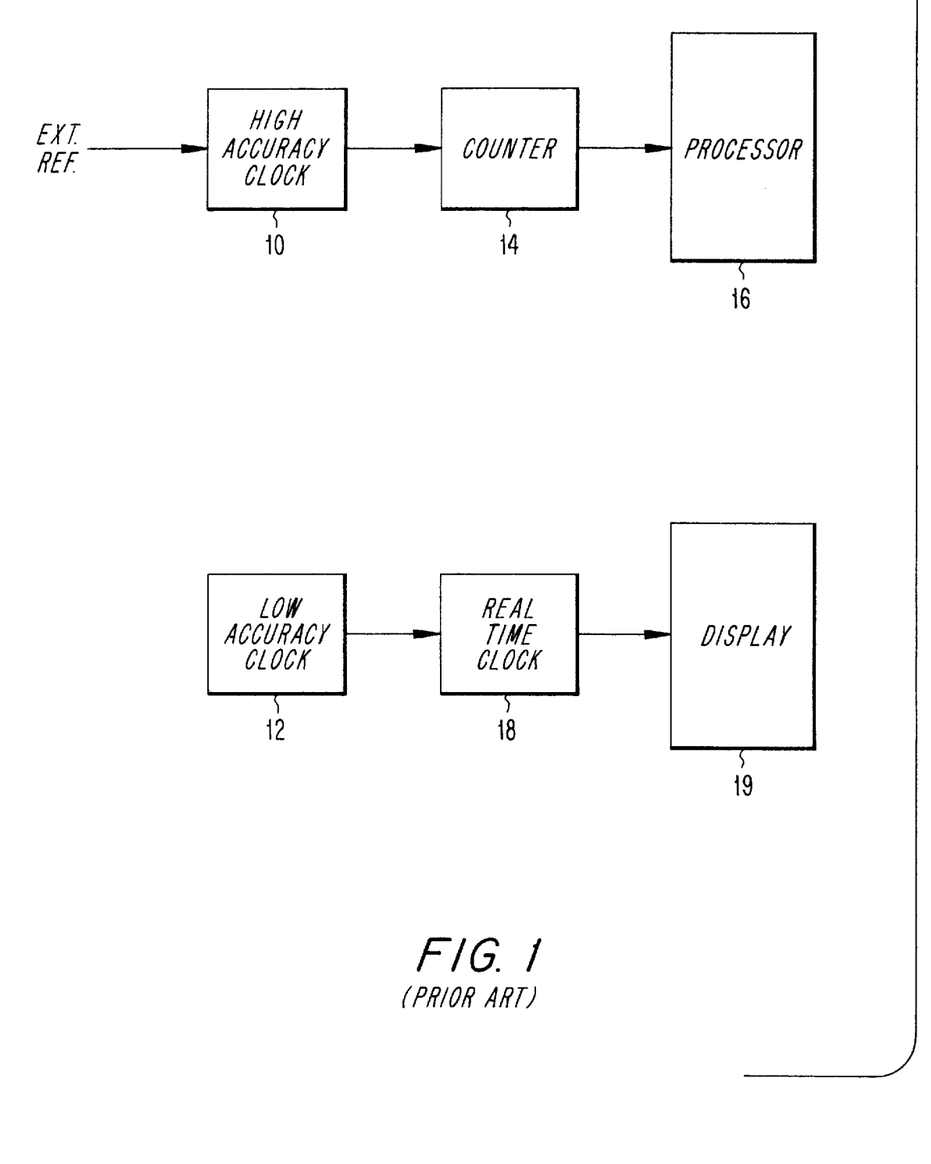
FIG. 1 depicts an exemplary conventional clock signal generation system employing two clocks.

In addition to minimizing the monitoring activity required by a mobile station in order to conserve battery power, internal adjustments can be made to further increase the energy efficiency of these units. For example, FIG. 1 depicts a conventional system configuration wherein the mobile station is provided with two clock signal generators. One clock signal generator 10 is precisely tuned to an external timing reference which serves as a time base for global system timing. The other clock signal generator 12 has its own local oscillator crystal (not shown) and is free running. The clock signal generator 12 has lower accuracy than clock signal generator 10 but may be optimized for low power operation.

The counter 14 receives clock pulses from the clock signal generator 10 and outputs system timing signals (sometimes referred to as "system ticks") having a well defined timing, which signals are used to strobe processor 16. Processor 16 controls the various receive and transmit functions of the mobile station, among other processes. As known by those skilled in the art, processor 16 requires strobing signals having precisely controlled timing and is, therefore, conventionally clocked by the high accuracy clock signal generator 10. Among other things, in a TDMA-based radio communication system, the system timing pulses received from counter 14 may be used by the processor 16 to identify the time slots assigned to an idle mobile station for decoding paging messages.

By way of contrast, the low accuracy clock signal generator 12 is conventionally used for controlling circuitry with less critical timing requirements, for example, a real-time clock (RTC) 18. RTC 18 can, in turn, supply the local time for output on the mobile station's display 19. Since low accuracy clock signal generator 12 is designed for low current operation, it may be sourced from a low-apacity voltage supply, for example, a back-up battery (not shown).

The high accuracy clock signal generator 10 provides the basic system reference time and typically provides clocking pulses which are distributed to most of the circuitry in the system. Given its importance, high accuracy clock signal generator 10 also includes circuitry for accuracy control, for example, compensation for temperature and manufacturing variation. With this additional complexity and with the wide distribution connectivity load, the high accuracy clock signal generator 10 consumes more power than the low accuracy clock signal generator 12.

During the active mode (i.e., when the mobile station is connected to the system by way of a traffic channel) most of the circuitry is active in the above described system. But in a TDMA-based telephone system, activity during the stand-by or idle mode (i.e., when the mobile station listens periodically to the control or access channel) is limited. During the idle mode, most of the activity is related to decoding of paging messages which, as described above, are transmitted for a particular mobile station during an assigned paging time slot, i.e., a fraction of the total time. During time slots other than its assigned paging time slot, the mobile station can enter a sleep mode during which it does not monitor its control channel. This allows the mobile station to reduce power consumption and extend battery life.

Since the high accuracy clock is also a relatively large consumer of power and the low accuracy clock is a relatively small consumer of power, it would be desirable to use the low accuracy clock as much as possible to increase times between battery recharge. Unfortunately, conventional remote unit design recognizes that for most of the functional circuitry in the remote unit, clock accuracy cannot be sacrificed. Thus, the conventional remote unit of FIG. 1 suffers from the problem of high power consumption within the clock signal generation system. Although it would be desirable to use the low accuracy clock for additional functionality, the problems associated with this concept include that the low accuracy clock is simply too inaccurate to, for example, strobe the processor 16 according to conventional techniques.

SUMMARY

According to exemplary embodiments of the present invention, additional reductions in power consumption are possible by turning off the high accuracy clock signal generator during the portion of the sleep mode other than a mobile station's assigned paging time slot and using, instead, the low accuracy clock signal generator to provide timing signals during that time. Due to the timing requirements of decoding paging messages, however, the high accuracy clock signal generator should be used when the mobile station "wakes up" to decode paging messages received during its assigned paging time slot. Thus, it is important that the timing signals provided by the low accuracy clock signal generator to the processor during sleep mode be sufficiently accurate that the mobile station wakes up at the proper time so that it can decode all of the messages received during its assigned paging time slot. According to exemplary embodiments of the present invention, the accuracy of the low accuracy clock signal generator is periodically measured against that of the high accuracy clock signal generator.

For example, during a measure mode of clock signal generation systems according to the present invention, a first counter counts output pulses from the high accuracy clock signal generator until it receives a predetermined number of those pulses. At this time, the first counter outputs a system timing signal used by the processor for internal timing processes. While the first counter is counting pulses from the high accuracy clock signal generator, a second counter counts pulses output from the low accuracy clock signal generator. The second counter also receives the system timing signals output from the first counter. The number of low accuracy clock pulses counted between system timing signals from the first counter is an indicator of the relative accuracy of the low accuracy clock signal generator. Moreover, the counted number of low accuracy clock pulses per system timing signal can be stored and averaged to provide an up-to-date indication as to how many of the low accuracy clock pulses should be used to create system timing signals when the high accuracy clock is turned off.

Then, when operating in a free running mode, the second counter counts pulses received from the low accuracy clock signal generator until it reaches a threshold, which threshold is based upon the value determined during the measuring mode. Then, the second counter outputs a system timing signal when the number of clock pulses received from the low accuracy clock signal generator reaches the predetermined threshold. This system timing signal is used to strobe the processor during the portion of sleep mode when the remote unit does not need to decode received paging messages. By periodically measuring the accuracy of the low accuracy clock signal generator in the manner described above, the system tuning pulses used to strobe the processor during sleep mode are sufficiently accurate to enable the processor to "wake up" the receive and decoding circuitry at the appropriate time to permit accurate decoding of paging messages during its assigned paging time slot.

According to other exemplary embodiments of the present invention, the low accuracy clock signal generator is also used to provide clock pulses to a real time clock function. The real time clock function, in turn, provides a current time for output on a display of the remote station. This allows a user of the remote station to have a time reference for making calls. Since the accuracy of the low accuracy clock is periodically checked as described above to enable system timing to be handled by the low accuracy clock signal generator during part of the sleep mode, this information can also be used to compensate for inaccuracies in the real time clock. For example, after a certain amount of inaccuracy associated with the low accuracy clock signal generator is observed during the measure mode described above, the processor of the remote unit can instruct the real time clock to add or subtract a second from its determined current time in order to compensate for inaccuracies in the clock pulses it received from the low accuracy clock signal generator.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to those skilled in the art that the present invention may be practiced in other embodiments that depart from these specific details. In other instances, detailed descriptions of well-known methods, devices and circuits are emitted so as not to obscure the description of the present invention with unnecessary detail.

According to exemplary embodiments of the present invention, reduced power consumption is achieved by using a low accuracy (and low power consumption) clock pulse generator to strobe a remote unit's processor during sleep mode. As mentioned above, the phrase "sleep mode" refers to periods of low activity during which a remote station can power down certain circuitry. A remote unit might enter sleep mode, for example, when it is not expecting to receive a paging message, i.e., during time slots other than its assigned paging time slot. An active mobile station (i.e., one which is connected to the system via a traffic channel) might enter sleep mode during time slots when it is not due to transmit, receive or measure. Although the following examples illustrate the application of the present invention to the former type of sleep mode, those skilled in the art will appreciate that the high accuracy clock can be turned off during other sleep modes in the same manner described below. Those skilled in the art will be familiar with sleep modes generally and, therefore, no fueler discussion of this feature of conventional radio communication systems is provided here.

Figure 2A:
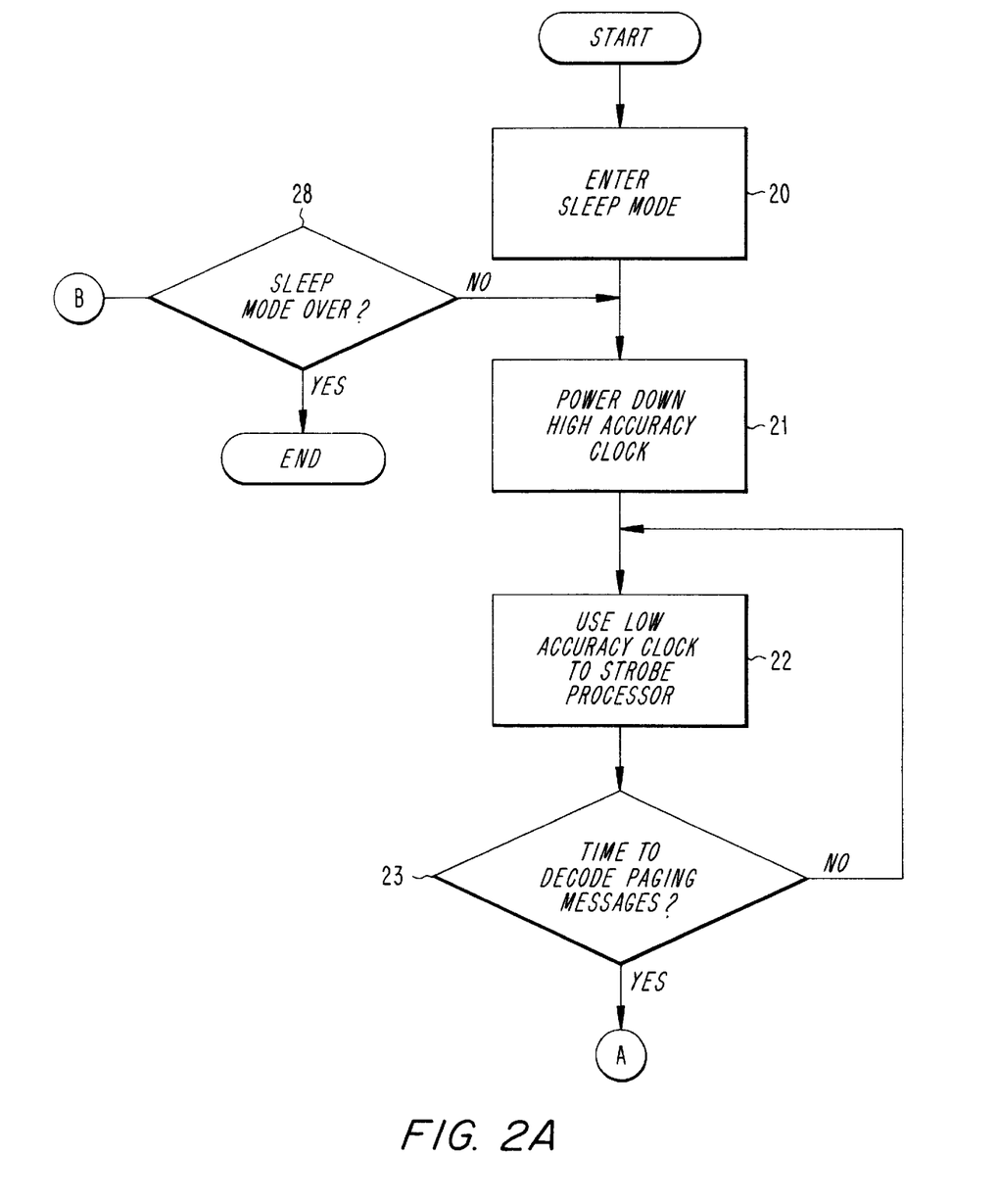
FIG. 2A is a first part of a flow chart illustrating an exemplary method for conserving power in a remote unit according to an exemplary embodiment of the present invention.

FIG. 2A illustrates part of an exemplary method for reducing power consumption according to the present invention. Therein, at step 20, a remote unit enters the sleep mode by powering down non-essential circuitry when the remote unit is not actively connected to the system. According to exemplary embodiments of the present invention, this includes powering down a high accuracy clock (also a high power consumption clock) at step 21. Then, a low accuracy clock is used to strobe the remote unit's processor as depicted by step 22. This step presupposes that the timing of the low accuracy clock has previously been measured (as will be described below) to ensure sufficient accuracy of the strobes generated using the low accuracy clock. This mode of operation is referred to herein as free-running mode, since the low accuracy clock operates independently of the high accuracy clock at this time. This process continues until it becomes time to decode paging messages which may be addressed to that particular remote unit, i.e., when that remote unit's assigned paging time slot arrives, as indicated by step 23.

Figure 2B:
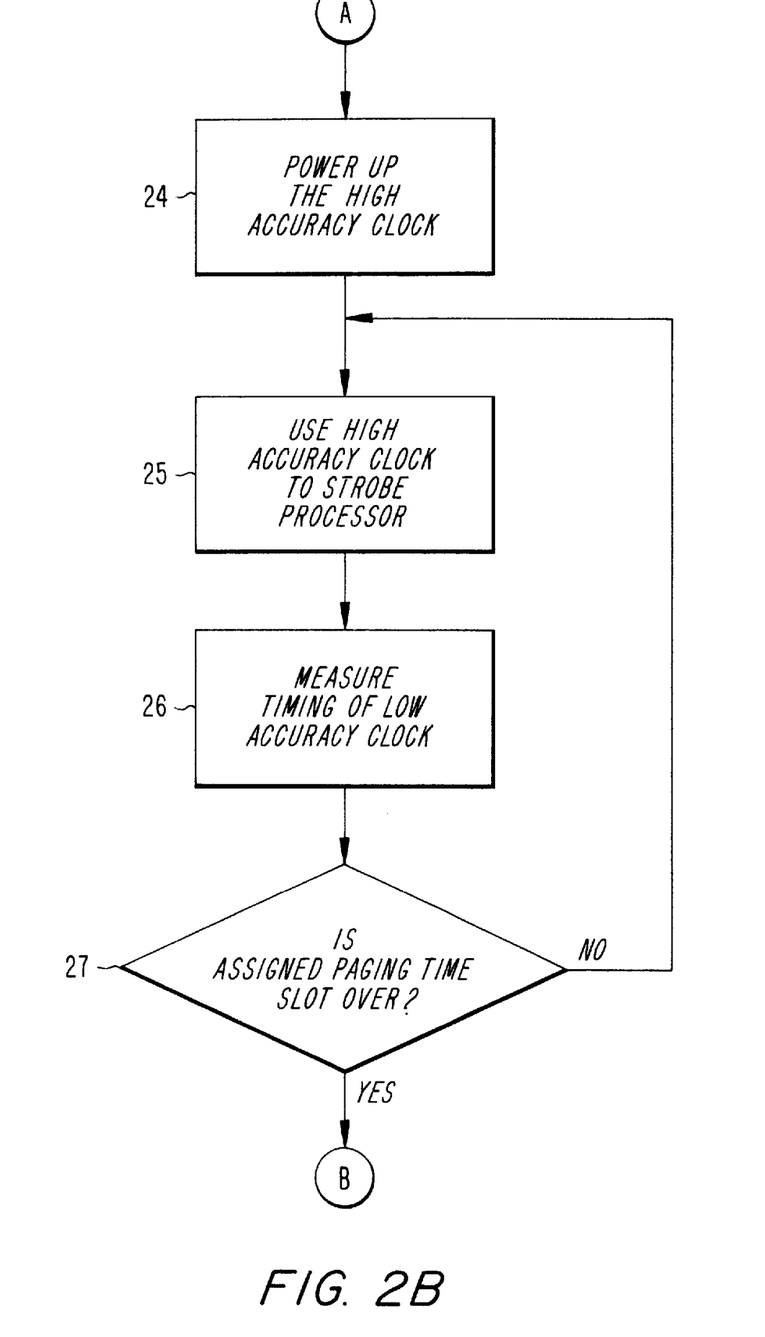
FIG. 2B is a second part of the flow chart of FIG. 2A.

Referring now to FIG. 2B, when the remote unit's assigned paging time slot arrives, the system then powers up the high accuracy clock as illustrated in step 24. The clock pulses generated by the high accuracy clock are then used to strobe the remote unit's processor (step 25) during the time period when the remote unit needs to decode received paging messages to ascertain whether or not any of those messages are directed to that remote unit. While the high accuracy clock is being used to strobe the processor, exemplary techniques according to the present invention also use the high accuracy clock to periodically benchmark the timing of the low accuracy clock as depicted by step 26. Thus, this mode of operation is referred to herein as the "measure mode" of clock signal generation systems according to the present invention. As will be described in greater detail below, the number of low accuracy clock pulses generated between system timing signals created based on the high accuracy clock can be stored and/or averaged so that when the low accuracy clock is again used to strobe the remote unit's processor during sleep mode, relatively accurate system timing signals can be generated using the low accuracy clock. When the remote unit's assigned paging time slot is over, at step 27, the flow returns to FIG. 2A wherein it is determined at step 28 whether sleep mode has ended. If so, then the remote station's user has initiated an active connection or has powered off the remote station and the process terminates. Otherwise, another iteration is performed wherein the high accuracy clock is again powered down during periods other than the remote unit's assigned paging time slot. Of course, if the remote unit does receive a paging message during one of its assigned paging time slots indicating that it is to be connected to the radio communication system to support a connection, then the remote unit would exit sleep mode and the high accuracy clock would continue its function as the primary time reference source for the remote unit.

Having provided an overview as to how exemplary embodiments of the present invention conserve energy by periodically powering down a high accuracy (and high power consumption) clock, a more detailed description of apparatuses and techniques for implementing this functionality will now be described. According to exemplary embodiments of the present invention, a remote unit (e.g., a mobile phone) includes a central processing unit for controlling the various functionality provided by the phone including operation of the receive and transmit circuitry, for example. In order to provide these control functions, the central processing unit needs to receive accurate reference timing inputs as will be appreciated by those skilled in the art. For example, the central processing unit needs to receive clock pulses at a predetermined operating frequency associated with the processor. Another timing reference which can be used by central processing units according to the present invention is a system timing signal (or system "tick") which typically has a much lower frequency than the clock pulses which are also received by the central processing unit.

Figure 3:
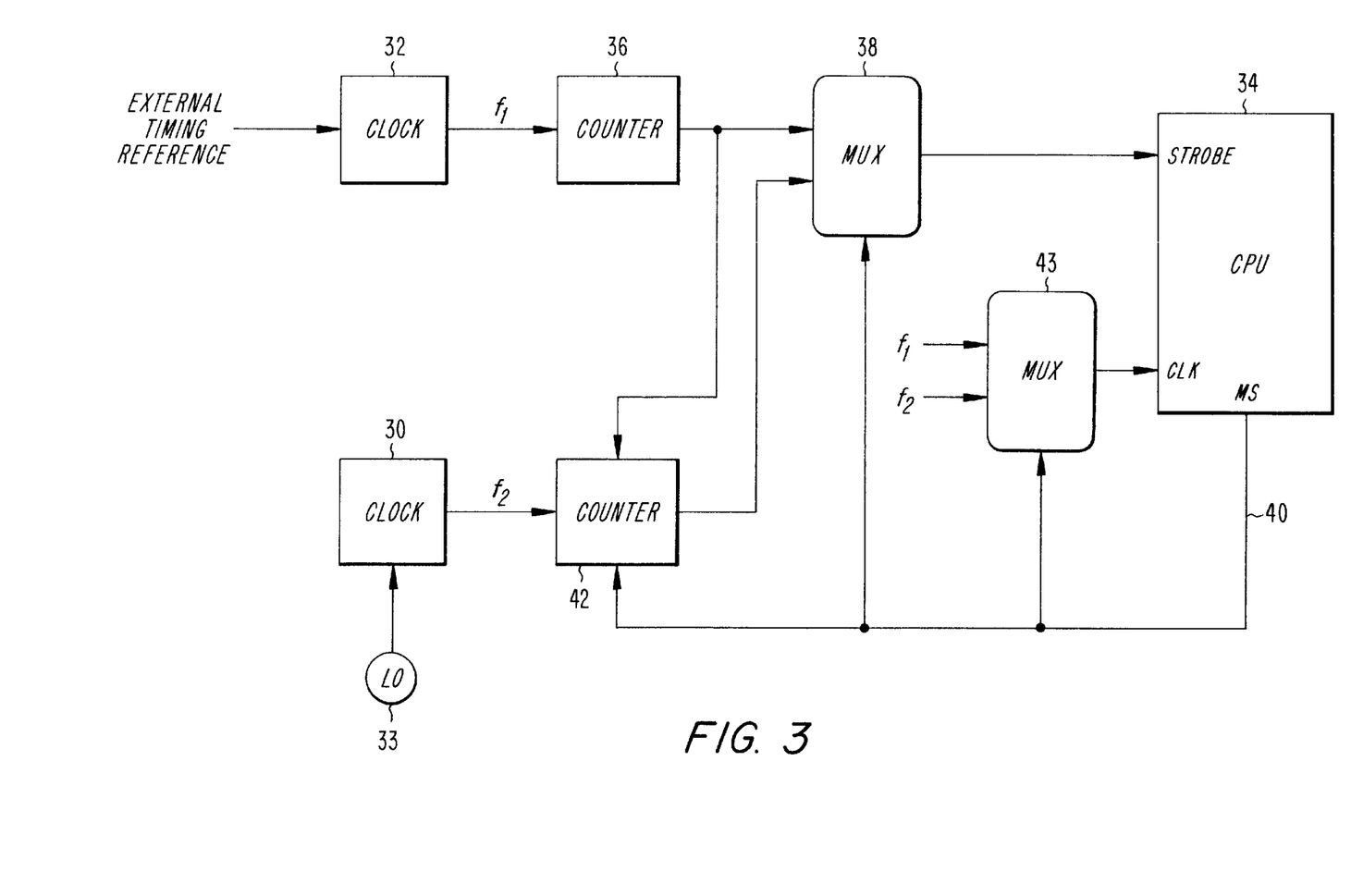
FIG. 3 shows a portion of a radiocommunication device including a clock signal generation system according to an exemplary embodiment of the present invention.

FIG. 3 illustrates one exemplary embodiment of the present invention wherein a low accuracy clock signal generator 30 and a high accuracy clock signal generator 32 can alternatively be used to provide the system timing signals used to strobe a central processing unit (CPU) 34 associated with a remote unit. The high accuracy clock signal generator 32 receives external timing information received over the air interface, while the low accuracy clock signal generator receives timing information from a local oscillator 33. As described above, the clock signal generation system of FIG. 3 is operable in two modes. In the measure mode, the high accuracy clock signal generator 32 outputs clock signal pulses which are used to generate system timing signals that, in turn, are used to strobe the central processing unit 34. As described above, the measure mode will be used, for example, during the remote unit's assigned paging time slot so that the central processing unit 34 receives highly accurate timing information while it decodes received paging messages. For example, the pulses output from high accuracy clock signal generator 32 at frequency f1 are counted by counter 36. Once counter 36 has received a predetermined number of the clock pulses from clock 32, e.g., 400, the counter 36 then outputs a system timing signal to multiplexer 38. While in the measure mode, the central processing unit 34 outputs a mode select (MS) signal on signal line 40 which allows the system timing signals created by counter 36 to be selectively output from the multiplexer 38 to the STROBE input of central processing unit 34.

At the same time, the system timing signal generated by counter 36 is also input to counter 42. Counter 42 is the recipient of clock pulses from the low accuracy clock signal generator 30. In the measure mode, counter 42 counts the number of low accuracy clock pulses received from clock signal generator 30 between each system timing signal generated by counter 36. This allows counter 42 to determine how many low accuracy clock pulses comprise each system timing interval at any particular time during the operational lifetime of the remote station. As will be apparent to those skilled in the art, the accuracy of low accuracy clock signal generator 30 (and thus the number of low accuracy clock pulses in each system timing interval) will vary over time due to the effects of aging, temperature, etc.

For example, suppose that the accuracy clock signal generator 32 generates 400 clock signal pulses for each system timing signal output from counter 36. However, between two exemplary system timing signals output from counter 36, counter 42 receives only 390 clock pulses from the low accuracy clock signal generator 30, while between another two exemplary system timing signals generated later, counter 42 receives 410 clock pulses from the low accuracy clock signal generator 30. Since this number will vary over time, measurements should be recorded periodically by counter 42 and stored therein for usage during the next free running mode to be described below. If desirable, statistical smoothing functions (e.g., averaging) can be used to provide the best possible estimate of the number of clock pulses from low accuracy signal generator 30 which comprise the system timing interval.

During a free running mode, the counter 42 is used to generate the system timing signals. The free running mode is initiated by the processor changing the value on the mode select line 40, e.g., after its assigned paging time slot is over while the remote unit is still in the idle mode. Then, using the predetermined threshold determined using information stored in counter 42 from the measure mode, counter 42 will count the predetermined number of clock pulses received from low accuracy clock signal generator 30 and then output a system timing signal to the multiplexer 38. Multiplexer 38 will, in turn, pass this system timing signal on to the STROBE input of central processing unit 34 as controlled by the mode select signal driven by CPU 34 on signal line 40. At the same time, the high accuracy clock signal generator 32 can be powered down since it is no longer needed during this portion of the sleep mode. When it is time to decode paging messages received during this particular remote unit's assigned paging time slot, the central processing unit will then switch back to the measure mode and power up the high accuracy clock signal generator 32 once again. Multiplexer 43 provides the clock pulses from the high accuracy clock signal generator 30 (when powered on) or the lower accuracy clock signal generator 32 (otherwise) to the CLK input of CPU 34.

Figure 4:
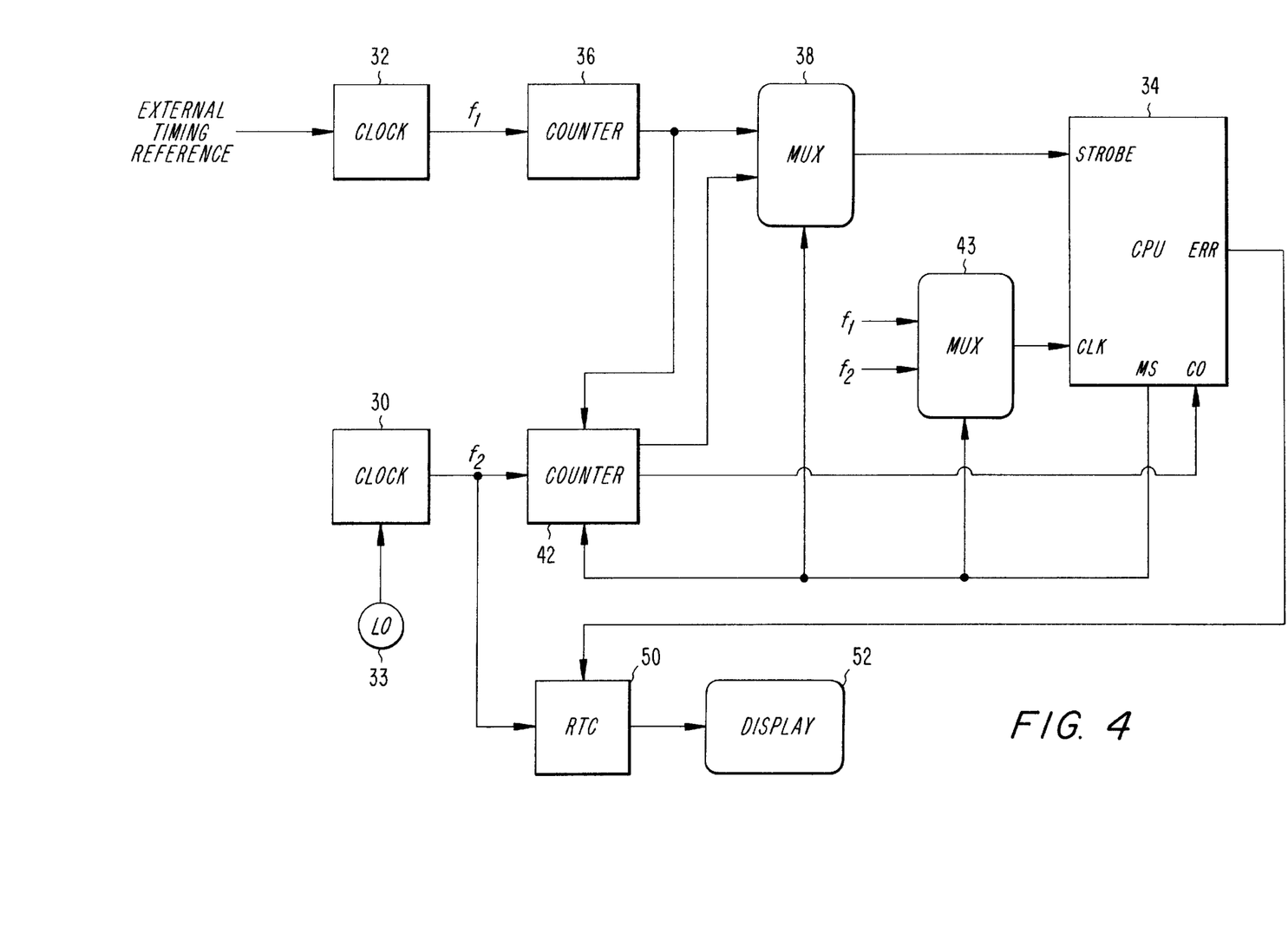
FIG. 4 shows a portion of a radiocommunication device including a clock signal generation system according to another exemplary embodiment of the present invention.

According to another exemplary embodiment of the present invention, the error compensation described above, used therein to ensure that the system timing signal is generated with sufficient accuracy even when based upon the low accuracy clock signal generator pulses, can also be used to correct the timing of a real time clock. As mentioned above, conventional applications of a low accuracy clock signal generator have included providing a reference for a real time clock function that is used to drive a display of the remote unit. Since the accuracy of the low accuracy clock signal pulses are periodically checked according to the above-described exemplary embodiment of the present invention, the information can also be used to correct the output of the real time clock to render the displayed current time by the remote unit more accurate. For example, with reference to FIG. 4, wherein like elements with respect to FIG. 3 are referred to using the same reference numerals, the threshold determined during the measure mode by counter 42 is provided to the CO input of CPU 34. The CPU 34 uses this signal to determine cumulative timing errors associated with the low accuracy signal generator 30 and to provide a corrective output signal (ERR) to real time clock 50. For example, since the CPU 34 knows how many high accuracy clock pulses there are between two system ticks, the CPU can compare this number with the threshold number measured by counter 42. Thus, if, for example, the CO input to CPU 14 reads 999 and the CPU knows that there are 1,000 high accuracy clock pulses between system ticks, then the CPU would add an extra second for every 999 RTC seconds. This enables RTC 50 to supply a more accurate time for output on display 52.

The above-described exemplary embodiments are intended to be illustrative in all respects, rather than restrictive, of the present invention. Thus the present invention is capable of many variations in detailed implementation that can be derived from the description contained herein by a person skilled in the art. For example, although the foregoing exemplary embodiments have been described in the context of powering down the high accuracy clock during sleep mode and waiting for an assigned paging time slot to power up the high accuracy clock once again. Those skilled in the art will appreciate that other remote unit activities can be used to trigger the wake up of a high accuracy signal clock. For example, such activities might include one or more of: measuring the status of the air interface, identification of base stations, determining a position of the remote unit using GPS or other techniques, and logging the status of the batteries. All such variations and modifications are considered to be within the scope and spirit of the present invention as defamed by the following claims.

What is claimed is:

1. A remote unit operable in an idle mode to alternately wake-up and to enter a sleep mode, said remote unit comprising:
   a processing unit for controlling said remote unit;
   a clock signal generation system for generating system timing signals input to said processing unit, said clock signal generation system including:
      a first clock pulse generating unit for generating first clock pulses;
      a first counter for counting said first clock pulses and outputting one of said system timing signals when a counted number of said first clock pulses exceeds a first predetermined threshold;
      a second clock pulse generating unit for generating second clock pulses;
      a second counter for counting said second clock pulses and outputting one of said system timing signals when a counted number of said second clock pulses exceeds a second predetermined threshold; and
      a mechanism for receiving said system timing signals from said first and second counters and outputting system timing signals to said processing unit from said first counter when said processing unit is to wake-up and outputting system timing signals from said second counter when said processing unit is in sleep mode.

2. The remote unit of claim 1, wherein said remote unit wakes-up to listen for paging messages during an assigned paging time slot.

3. The remote unit of claim 1, wherein said first clock pulse generating unit is adapted to receive timing information from signals received over said air interface.

4. The remote unit of claim 3, wherein said second clock pulse generating unit is adapted to receive timing information from a local oscillator.

5. The remote unit of claim 1, wherein said second predetermined threshold is determined by counting, in said second counter, a number of said second clock pulses generated between system timing signals output by said first counter.

6. The remote unit of claim 1, wherein said mechanism is a multiplexer having a selection input driven by said processing unit.

7. The remote unit of claim 1, wherein said first clock pulse generating unit is powered down during said sleep mode.

8. The remote unit of claim 1, further comprising:
   a real-time clock, which receives said second clock pulses to determine a current time; and
   a display for displaying said current time.

9. The remote unit of claim 8, after comprising:

means for adjusting said current time determined by said real-time clock to compensate for inaccuracy associated with said second clock pulses.

10. A clock generation system for generating system timing signals comprising:

a first clock pulse generating unit for generating first clock signals;

a first counter for counting said first clock pulses and outputting a system timing signal when a counted number of said first clock pulses exceeds a first predetermined threshold;

a second clock pulse generating unit for generating second clock pulses;

a second counter for receiving said second clock pulses and operable in either a measure mode or a free-running mode;

wherein, in said measure mode, said second counter counts a number of said second clock pulses between said system timing signals output by said first counter to determine a second predetermined threshold; and wherein, in said free-running mode, said second counter counts said second clock pulses and outputs a system timing signal when a counted number of said second clock pulses exceeds said second predetermined threshold; and means for receiving said system timing signal from said first and second counters and outputting system timing pulses received from said first counter during said measure mode and outputting system timing pulses received from said second counter during said free-running mode.

11. The clock generation system of claim 10, wherein said first clock pulse generating unit is adapted to receive external timing information.

12. The clock generation system of claim 11, wherein said second clock pulse generating unit is adapted to receive timing information from a local oscillator.

13. The clock generation system of claim 10, wherein said means for receiving is a multiplexer having a selection input for receiving an indication of said operation mode.

14. The clock generation system of claim 10, wherein said first clock pulse generating unit is powered down during said free-running mode.

15. The clock generation system of claim 10, further comprising:

a real-time clock, which receives said second clock pulses to determine a current time; and a display for displaying said current time.

16. The clock generation system of claim 15, further comprising:

means for adjusting said current time determined by said real-time clock to compensate for inaccuracy associated with said second clock pulses.

17. The method of claim 16, wherein said remote unit is active during its assigned paging time slot.

18. A method for conserving power in a remote unit of a radiocommunication system comprising the steps of:

generating first timing pulses from a first source;

using said first timing pulses for timing in said remote unit when said remote unit is receiving;

powering down said first source during sleep mode periods when said remote unit is idle;

generating second timing pulses from a second source when said first source is powered down, wherein the first source has higher accuracy than said second source; and using said second timing pulses for timing in said remote unit when said remote unit is in sleep mode to conserve power.

19. The method of claim 18, wherein said first source consumes more power than said second source.

* * * * *